US009629192B2

(12) United States Patent
Zeng et al.

(10) Patent No.: US 9,629,192 B2
(45) Date of Patent: Apr. 18, 2017

(54) METHOD, TERMINAL, AND SYSTEM FOR REALIZING DEVICE TO DEVICE COMMUNICATION (71) Applicant: HUAWEI TECHNOLOGIES CO., LTD., Shenzhen (CN)

(72) Inventors: Qinghai Zeng, Shanghai (CN); Yi Guo, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 7 days.

(21) Appl. No.: 14/226,181

(22) Filed: Mar. 26, 2014

(65) Prior Publication Data
US 2014/0206372 A1 Jul. 24, 2014

Related U.S. Application Data (63) Continuation of application No. PCT/CN2012/080812, filed on Aug. 31, 2012.

(30) Foreign Application Priority Data

Sep. 30, 2011 (CN) .......................... 2011 1 0297125

(51) Int. Cl.
H04W 76/02 (2009.01)
H04W 72/04 (2009.01)
H04W 8/26 (2009.01)

(52) U.S. Cl.
CPC ....... H04W 76/023 (2013.01); H04W 72/042 (2013.01); H04W 72/0453 (2013.01); H04W 8/26 (2013.01)

(58) Field of Classification Search
CPC ...... H04W 76/023; H04W 28/04; H04L 5/001
See application file for complete search history.

(56) References Cited

U.S. PATENT DOCUMENTS

2007/0129076 A1 6/2007 Cho et al.
2009/0011778 A1 1/2009 Jung et al.
(Continued)

FOREIGN PATENT DOCUMENTS

CN 101715237 A 5/2010
CN 101742626 6/2010
(Continued)

OTHER PUBLICATIONS

Extended European Search Report dated Dec. 2, 2014 in corresponding European Patent Application No. 12835658.1.
(Continued)

Primary Examiner — Vladimir Magloire
Assistant Examiner — Ernest Tacsik
(74) Attorney, Agent, or Firm — Staas & Halsey LLP (57) ABSTRACT Embodiments of the present invention disclose a method, device, and system for realizing device to device communication. The communication method includes: acquiring a wireless network temporary identifier used for device to device communication; receiving transmission grant information scrambled through the wireless network temporary identifier used for the device to device communication; and performing the device to device communication according to descrambled transmission grant information. In the present invention, by sending, to the terminal, the wireless network temporary identifier used for performing the device to device communication and the transmission grant information, the terminal may realize the D2D communication according to the wireless network temporary identifier used for performing the device to device communication and the transmission grant information, thereby satisfying a requirement of D2D data transmission between terminals.

19 Claims, 6 Drawing Sheets

(56) References Cited

U.S. PATENT DOCUMENTS

| | | |
|---|---|---|
| 2009/0285119 A1 | 11/2009 | Horn et al. |
| 2010/0034161 A1 | 2/2010 | Luo et al. |
| 2010/0040029 A1 | 2/2010 | Doppler et al. |
| 2010/0061294 A1* | 3/2010 | Proctor et al. ............... 370/328 |
| 2010/0061334 A1 | 3/2010 | Gault et al. |
| 2010/0105404 A1* | 4/2010 | Palanki ............... H04L 1/0025 455/450 |
| 2010/0215006 A1* | 8/2010 | Ho et al. ............... 370/329 |
| 2010/0238872 A1* | 9/2010 | Kim ............... H04W 74/008 370/329 |
| 2010/0268775 A1* | 10/2010 | Doppler et al. ............ 709/204 |
| 2010/0272046 A1* | 10/2010 | Guo ............... 370/329 |
| 2010/0323709 A1* | 12/2010 | Nam ............... H04B 7/043 455/450 |
| 2011/0096735 A1* | 4/2011 | Damnjanovic ....... H04L 1/1861 370/329 |
| 2011/0098043 A1* | 4/2011 | Yu et al. ............... 455/435.1 |
| 2011/0151887 A1* | 6/2011 | Hakola et al. ............ 455/452.2 |
| 2011/0194514 A1 | 8/2011 | Lee et al. |
| 2012/0099452 A1 | 4/2012 | Dai et al. |
| 2014/0023008 A1 | 1/2014 | Ahn et al. |
| 2014/0204852 A1 | 7/2014 | Iwamura et al. |

FOREIGN PATENT DOCUMENTS

| | | |
|---|---|---|
| CN | 101772199 | 7/2010 |
| CN | 102037752 | 4/2011 |
| CN | 102113242 A | 6/2011 |
| CN | 102113403 A | 6/2011 |
| CN | 102172093 | 8/2011 |
| JP | 2009-17559 | 1/2009 |
| JP | 2012-528495 | 11/2012 |
| JP | 2012-244366 | 12/2012 |
| WO | 2010/017475 | 2/2010 |
| WO | 2010/145463 A1 | 12/2010 |
| WO | 2011/051745 | 5/2011 |
| WO | WO 2011069295 A1 * | 6/2011 |
| WO | 2011/116017 A1 | 9/2011 |

OTHER PUBLICATIONS

International Search Report mailed Dec. 13, 2012 in corresponding International Patent Application No. PCT/CN2012/080812.
Japanese Office Action dated Mar. 10, 2015 in corresponding Japanese Patent Application No. 2014-532229.
PCT International Search Report and Written Opinion of the International Searching Authority dated Dec. 13, 2012 in corresponding International Patent Application No. PCT/CN2012/080812.
"On the need for a 3GPP study on LTE device-to-device discovery and communication", Qualcomm Incorporated, 13.2, 3GPP TSG-RAN #52, Bratislava, Slovakia, May 31-Jun. 3, 2011, 2 pp.
Chinese Office Action issued on Oct. 10, 2014 in corresponding Chinese Patent Application No. 201110297125.1.
Chinese Search Report issued on Sep. 25, 2014 in corresponding Chinese Patent Application No. 2011102971251.
Japanese Office Action dated Jan. 4, 2016 in corresponding Japanese Patent Application No. 2014-532229, 8 pages.
Chinese Office Action dated Jan. 18, 2016 in corresponding Chinese Patent Application No. 201110297125.1, 6 pages.
Chinese Search Report dated Jan. 18, 2016 in corresponding Chinese Patent Application No. 201110297125.1, 1 page.
Japanese Notice of Allowance dated Aug. 16, 2016 in related Japanese Patent Application No. 2014-532229 (3 pages).

* cited by examiner

METHOD, TERMINAL, AND SYSTEM FOR REALIZING DEVICE TO DEVICE COMMUNICATION

CROSS-REFERENCE TO RELATED APPLICATIONS

This application is a continuation of International Application No. PCT/CN2012/080812, filed on Aug. 31, 2012, which claims priority to Chinese Patent Application No. 201110297125.1, filed on Sep. 30, 2011, both of which are hereby incorporated by reference in their entireties.

FIELD OF THE INVENTION

Embodiments of the present invention relate to the field of communications, and in particular, to a method, terminal, and system for realizing device to device communication.

BACKGROUND OF THE INVENTION

A device to device (device to device, D2D for short) technology is a communications technology of direct data exchange between devices under control of a mobile network. The D2D technology under systems such as a long term evolution (long term evolution, LTE for short) system is still in a conceptual stage, and no standardization work is started.

SUMMARY OF THE INVENTION

A technical problem to be solved by embodiments of the present invention is how to realize device to device communication.

In order to solve the technical problem, an embodiment of the present invention provides a method for realizing device to device communication, which includes:

acquiring a wireless network temporary identifier used for device to device communication;

receiving transmission grant information scrambled through the wireless network temporary identifier used for the device to device communication; and performing the device to device communication according to descrambled transmission grant information.

Accordingly, an embodiment of the present invention further provides a terminal, which includes:

an acquisition module, configured to acquire a wireless network temporary identifier used for device to device communication and transmission grant information scrambled through the wireless network temporary identifier used for the device to device communication; and a processing module, configured to perform the device to device communication according to descrambled transmission grant information.

Accordingly, an embodiment of the present invention further provides a communication system, which includes a first terminal, a second terminal, and a base station, where the first terminal and the second terminal each are configured to acquire a wireless network temporary identifier which is sent by the base station and used for device to device communication, receive transmission grant information which is sent by the base station and scrambled through the wireless network temporary identifier used for the device to device communication, and perform the device to device communication according to descrambled transmission grant information.

Implementation of the embodiments of the present invention has the following beneficial effects:

By sending, to the terminal, the wireless network temporary identifier used for performing the device to device communication and the transmission grant information, the terminal may realize the D2D communication between the terminals according to the wireless network temporary identifier used for performing the device to device communication and the transmission grant information, thereby satisfying a requirement of D2D data transmission between users.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons skilled in the art based on the embodiments of the present invention without creative efforts shall fall within the protection scope of the present invention.

Figure 1:
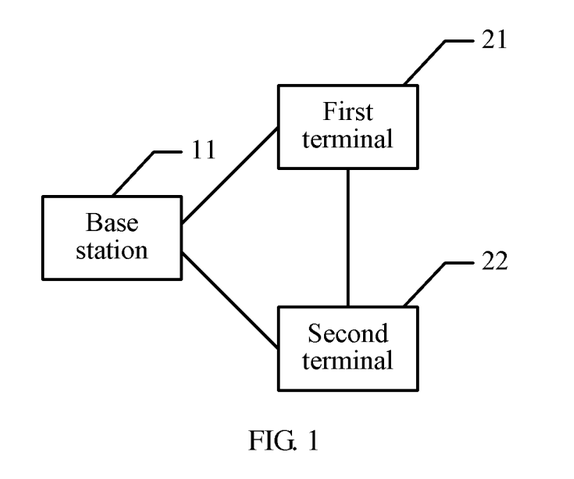
FIG. 1 is a schematic structural diagram of a communication system according to an embodiment of the present invention.

FIG. 1 is a schematic structural diagram of a communication system according to an embodiment of the present invention. The system described in this embodiment includes a base station 11, a first terminal 21, and a second terminal 22.

When the first terminal 21 and the second terminal 22 need to perform D2D communication, the first terminal 21 and the second terminal 22 each are configured to acquire a wireless network temporary identifier which is sent by the base station 11 and used for the D2D communication, receive transmission grant information which is sent by the base station 11 and scrambled through the wireless network temporary identifier used for the D2D communication, and perform the device to device communication according to the descrambled transmission grant information.

The base station 11 may send, to the first terminal 21 and the second terminal 22 through a radio resource control (radio resource control, RRC for short) message, the wireless network temporary identifier used for performing the D2D communication and the transmission grant information, where the transmission grant information may be an uplink grant or a downlink grant.

The first terminal 21 and the second terminal 22 perform the D2D communication according to the descrambled transmission grant information by: acquiring transmission carrier information, and performing, on a carrier indicated by the transmission carrier information, the device to device communication according to the transmission grant information. The acquiring the transmission carrier information includes: acquiring the transmission carrier information sent by the base station 11, where the base station 11 may send the transmission carrier information through the RRC message; or acquiring the transmission carrier information according to the transmission grant information.

The first terminal 21 or the second terminal 22 is further configured to acquire one wireless network temporary identifier used for the device to device communication; and the transmission grant information includes device to device transmission direction indication information.

Alternatively, the first terminal 21 or the second terminal 22 is further configured to acquire two wireless network temporary identifiers used for the device to device communication; and the wireless network temporary identifier which is sent by the base station and used for the device to device communication is applicable to a device to device transmission direction.

Alternatively, the first terminal or the second terminal is further configured to acquire cell wireless network temporary identifiers of the first terminal and the second terminal; and the transmission grant information includes indication information of the device to device communication.

By sending, to the terminal, the wireless network temporary identifier used for performing the D2D communication and the transmission grant information, the terminal may realize the direct D2D communication between the terminals according to the wireless network temporary identifier used for performing the D2D communication and the transmission grant information, thereby satisfying a requirement of D2D data transmission between users.

Figure 2:
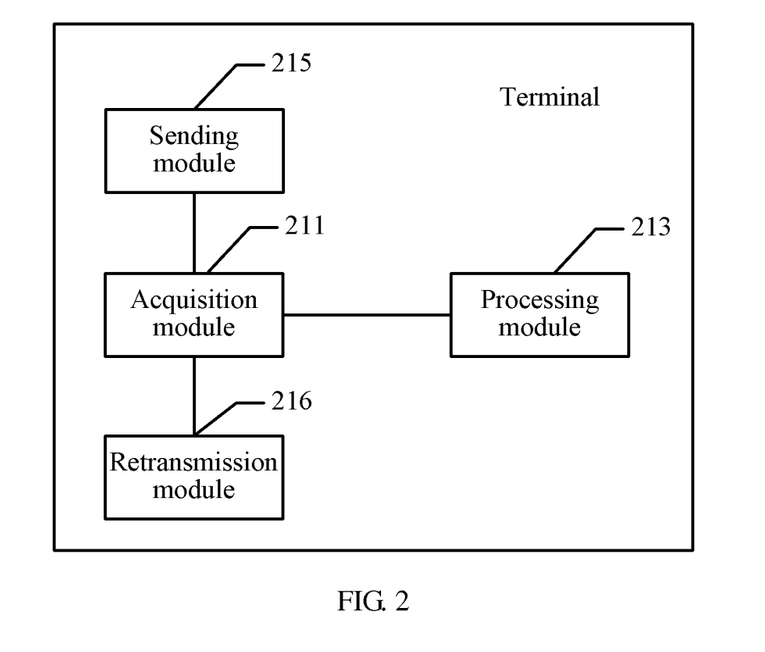
FIG. 2 is a schematic structural diagram of a terminal according to an embodiment of the present invention.

FIG. 2 is a schematic structural diagram of a terminal according to an embodiment of the present invention, and the first terminal 21 and the second terminal 22 in FIG. 1 that act as the terminals may have the same structure. In this embodiment, the first terminal 21 is taken as an example for illustration. Specifically, the first terminal 21 includes:

an acquisition module 211, configured to acquire a wireless network temporary identifier used for D2D communication and transmission grant information scrambled through the wireless network temporary identifier used for the D2D communication; and a processing module 213, configured to perform the device to device communication according to the descrambled transmission grant information.

The processing module 213 is further configured to perform the D2D communication according to the descrambled transmission grant information, which specifically includes: performing, on a carrier indicated by the transmission carrier information, the device to device communication according to the transmission grant information.

The acquisition module 211 is further configured to acquire the transmission carrier information. For example, the acquisition module 211 acquires the transmission carrier information sent by a base station; or, the acquisition module 211 acquires the transmission carrier information according to the transmission grant information.

The transmission carrier information acquired by the acquisition module 211 may be the transmission carrier information sent by the base station 11 through an RRC message, may also be the transmission carrier information acquired according to the transmission grant information, such as the carrier indicated in the transmission grant information by the base station 11.

The acquisition module 211 is further configured to acquire one wireless network temporary identifier used for the device to device communication; and the transmission grant information includes device to device transmission direction indication information.

Specifically, after descrambling, by using the acquired wireless network temporary identifier used for the D2D communication, the scrambled transmission grant information sent by the base station, the processing module 213 establishes a D2D communication connection, and sends or receives data according to a transmission direction indicated by the D2D transmission direction indication information included in the transmission grant information. For example, when the direction indicated by the transmission grant information descrambled by the first terminal 21 is from the first terminal 21 to the second terminal 22, the first terminal 21 sends the data. For another example, when the direction indicated by the transmission grant information descrambled by the first terminal 21 is from the second terminal to the first terminal, the first terminal 21 receives the data.

Alternatively, the acquisition module 211 is further configured to acquire two wireless network temporary identifiers used for the device to device communication; and the wireless network temporary identifier which is sent by the base station 11 and used for the device to device communication is applicable to a device to device transmission direction.

Specifically, the acquisition module 211 may acquire two wireless network temporary identifiers which are configured by the base station 11 and used for the D2D communication; the processing module 213 determines the D2D transmission direction according to a value of the wireless network temporary identifier used for the D2D communication. For example, when the value configured for the first wireless network temporary identifier used for the D2D communication is 100 and the value configured for the second wireless network temporary identifier used for the D2D communication is 200, if in the processing module 213, the descrambled transmission grant information is obtained by descrambling through the identifier with the value of 100, an applicable D2D transmission direction is determined to be from the first terminal 21 to the second terminal 22, and the first terminal 21 sends the data; if the descrambled transmission grant information is obtained by descrambling through the identifier with the value of 200, the applicable D2D transmission direction is determined to be from the second terminal 22 to the first terminal 21, and the first terminal 21 receives the data. The transmission direction which is corresponding to the value of the wireless network temporary identifier used for the D2D communication may be obtained through negotiation between the base station 11 and the terminal.

Alternatively, the acquisition module 211 is further configured to acquire cell wireless network temporary identifiers of the first terminal and the second terminal; and the transmission grant information includes the device to device communication indication information. The D2D communication indication information included in the transmission grant information is used for explaining to the first terminal 21 that the grant information is used for the D2D transmission. When the indication is not included, the first terminal 21 determines that the grant information is used for authorizing the transmission between the terminal and the base station, but not used for authorizing transmission of the D2D communication.

Specifically, the cell wireless network temporary identifiers of the first terminal 21 and the second terminal 22 may be configured to act as the wireless network temporary identifiers used for the D2D communication. When the D2D communication is performed according to the cell wireless network temporary identifiers, the acquisition module 211 needs to simultaneously acquire the cell wireless network temporary identifiers of the first terminal 21 (a local end) and the second terminal 22 (a peer end). The scrambled transmission grant information is descrambled by using the cell wireless network temporary identifier of the local end or of the peer end, and the processing module 213 performs the D2D communication with the second terminal 22 according to the descrambled transmission grant information. The first terminal 21 further includes a sending module 215 configured to: when the transmission grant information is obtained by descrambling through the cell wireless network temporary identifier of the first terminal 21, send the data to the second terminal 22 according to the transmission grant information; the acquisition module 211 is further configured to: when the transmission grant information is obtained by descrambling through the cell wireless network temporary identifier of the second terminal 22, receive, according to the transmission grant information, the data sent by the second terminal.

By sending, to the terminal, the wireless network temporary identifier used for performing the device to device communication and the transmission grant information, the terminal may realize the D2D communication according to the wireless network temporary identifier used for performing the device to device communication and the transmission grant information, thereby satisfying a requirement of D2D data transmission between users.

Furthermore, before sending the transmission grant information, the base station 11 is further configured to notify the first terminal 21 and the second terminal 22 of a mapping between logical channels of the device to device communication of the first terminal 21 and the second terminal 22. The acquisition module 211 in the first terminal 21 is further configured to acquire the mapping, which is sent by the base station and between the logical channels of the device to device communication. For example, the first terminal 21 needs to transfer a file to the second terminal 22 according to a file transfer protocol, and for the file transfer service, logical channel identifiers allocated to the first terminal 21 and the second terminal 22 by the base station 11 are 3 and 4 respectively. In this situation, the base station 11 needs to associate the logical identifier of 3 of the first terminal 21 with the logical identifier of 4 of the second terminal 22, and notify the two terminals of the mapping to enable the first terminal 21 and the second terminal 22 to receive and send data and to perform acknowledgement correctly. For another example, the base station 11 may allocate the same logical channel identifier to the same service of the D2D transmission performed by the two terminals. According to the mapping sent by the base station, the D2D communication may be better performed between the first terminal 21 and the second terminal 22.

Furthermore, as shown in FIG. 2, the sending module 215 of the first terminal 21 is further configured to: when the terminal is a sender and before the acquisition module 211 receives the transmission grant information scrambled through the wireless network temporary identifier used for the device to device communication, send buffer status of the logical channel of the device to device communication to the base station 11.

Before receiving the transmission grant information sent by the base station 11, if the first terminal 21 acts as a sender, the first terminal 21 may send, through the sending module 215, buffer status of the logical channel of the D2D communication to the base station 11. Specifically, the sending module 215 may indicate buffer status of the logical channel of the D2D transmission to the base station 11 by using a buffer status report (buffer status report, BSR for short) or an independent component in the BSR, such as buffer status corresponding to an independent logical channel group.

Furthermore, as shown in FIG. 2, the acquisition module 211 of the first terminal 21 is further configured to: when the second terminal 22 is a receiver, the first terminal 21 is a sender, and the second terminal 22 detects that radio link control serial numbers on the logical channel are out of order, receive radio link control RLC information sent by the second terminal 22; and the first terminal 21 further includes a retransmission module 216, configured to retransmit data to the second terminal 22 according to the RLC information.

Through the acquisition module 211 and the retransmission module 216, when an abnormality occurs during the D2D communication between the first terminal 21 and the second terminal 22, data retransmission is performed, so as to ensure the accuracy and completeness of data of the D2D transmission.

Furthermore, during the D2D communication, the first terminal 21 or the second terminal 22 is further configured to send a D2D transmission report to the base station 11. Specifically, the sending module 215 of the first terminal 21 is further configured to send the device to device transmission report to the base station 11. The device to device transmission report includes a report type indication. The report type indication may be at least one piece of the following information: device to device transmission failure information, device to device transmission completion information, and device to device transmission format adjustment information. For example, the device to device transmission format adjustment information may be used for indicating a device to device transmission situation, may also be used for indicating an adjustment on a modulation and coding scheme (modulation and coding scheme, MCS for short) of the current transmission and/or an adjustment on a data transmission power scheme.

The sending module 215 of the first terminal 21 may periodically send the D2D transmission report to the base station 11 according to time set by a timer. The timer may be configured by the base station 11. The base station 11 may indicate, according to the report type indication of D2D transmission failure or D2D transmission format adjustment in the transmission report, a new modulation and coding scheme (modulation and coding scheme, MCS for short) and/or data transmission power in an uplink grant sent to the first terminal 21, so as to instruct the first terminal 21 to adjust the MCS and/or the data transmission power before performing the data transmission. The first terminal 21 is further configured to: after receiving the device to device transmission format adjustment indication sent by the base station 11, when receiving again updated transmission grant information scrambled through the wireless network temporary identifier used for the device to device communication, restart the timer for retiming, so as to send the device to device transmission report to the base station 11.

The first terminal 21 may further send the D2D transmission report to the base station 11 when detecting that the number or proportion of abnormalities incurred to data transmission on the logical channel exceeds a preset threshold; or, when the number of data retransmissions reaches the preset maximum number of retransmissions, send the D2D transmission report to the base station 11, where the preset threshold for the number of abnormalities incurred to data transmission or the preset maximum number of retransmissions for the number of data retransmissions may be configured and then sent to the first terminal 21 by the base station 11. A specific manner in which the first terminal 21 sends the D2D transmission report may be selected according to actual needs.

If a report type of the D2D transmission report received by the base station 11 is D2D communication failure or D2D communication completion, the base station 11 may switch the logical channel of the D2D communication to an air interface transmission manner.

By sending the report to the base station for a notification of the transmission situation, the base station is enabled to adjust the MCS and/or the data transmission power of the D2D communication between the first terminal and the second terminal according to the report at any time, so as to better realize D2D communication between the first terminal and the second terminal.

Furthermore, at the end of the D2D communication, the first terminal 21 may further perform hybrid automatic repeat request (hybrid automatic repeat request, HARQ for short) perform acknowledgement with the second terminal 22, and perform HARQ retransmission. In order to simplify the realization of the terminal, the base station 11 may set the number of HARQ transmissions of the D2D transmission as 1, and notify the first terminal 21 and the second terminal 22 of the number, so that a complex physical uplink control channel (physical uplink control channel, PUCCH for short) designed for the D2D transmission may be avoided.

After the D2D communication ends, the HARQ acknowledgement is performed, so as to facilitate performing of the HARQ retransmission, and further ensure the accuracy and completeness of data of the D2D transmission, thereby better realizing the D2D communication.

A method for realizing device to device transmission of the present invention is described in detail in the following.

Figure 3:
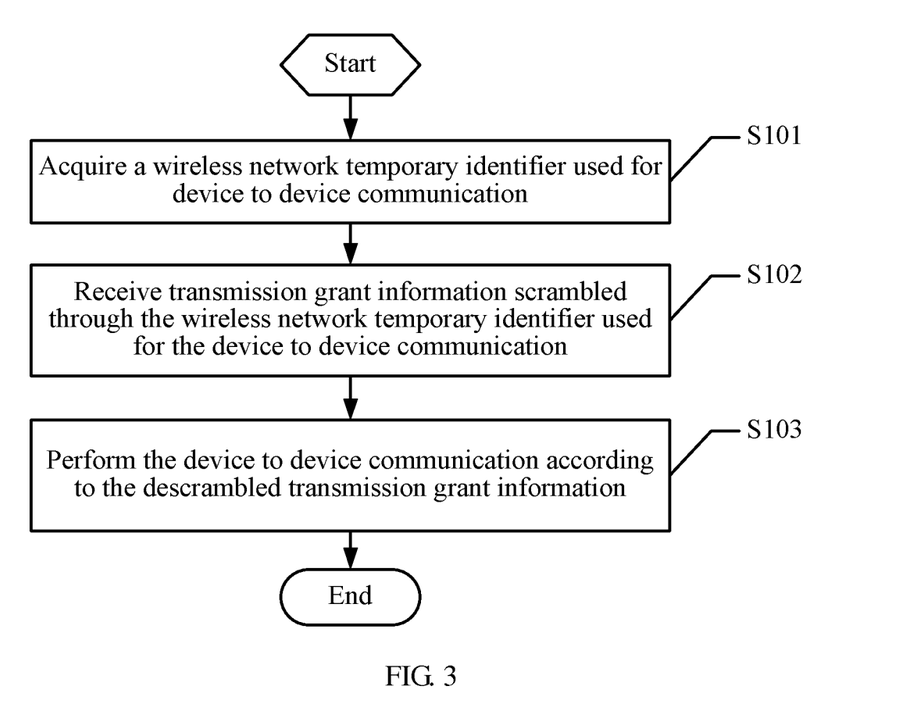
FIG. 3 is a schematic flow chart of Embodiment 1 of a method for realizing device to device communication of the present invention.

FIG. 3 is a schematic flow chart of Embodiment 1 of a method for realizing device to device transmission of the present invention. The method in this embodiment includes:

S101: Acquire a wireless network temporary identifier used for device to device communication;

S102: Receive transmission grant information scrambled through the wireless network temporary identifier used for the device to device communication; and S103: Perform the device to device communication according to the descrambled transmission grant information.

In this embodiment, terminals performing the D2D communication include a first terminal and a second terminal. The first terminal and the second terminal both execute the aforementioned steps from S101 to S103. The first terminal is taken as an example for illustration.

The first terminal acquires the wireless network temporary identifier used for the D2D communication in step S101, which includes: acquiring one wireless network temporary identifier used for the D2D communication; and the transmission grant information includes device to device transmission direction indication information.

Specifically, in step S103 after descrambling, by using the acquired wireless network temporary identifier used for the D2D communication, the scrambled transmission grant information received in step S102, a D2D communication connection is established in step S103, and data is sent or received according to a transmission direction indicated by the device to device transmission direction indication information included in the transmission grant information. For example, when the direction indicated by the transmission grant information descrambled by the first terminal is from the first terminal to the second terminal, the first terminal 21 sends the data. For another example, when the direction indicated by the transmission grant information descrambled by the first terminal is from the second terminal to the first terminal, the first terminal receives the data.

Alternatively, the first terminal acquires the wireless network temporary identifier used for the D2D communication in step S101, which includes: acquiring two wireless network temporary identifiers used for the D2D communication; and the acquired wireless network temporary identifiers used for the device to device communication are applicable to a device to device transmission direction.

Specifically, in step S101, two wireless network temporary identifiers used for the D2D communication may be acquired; in step S103, the D2D transmission direction is determined according to values of the wireless network temporary identifiers used for the D2D communication. For example, when the value configured for the first wireless network temporary identifier used for the D2D communication is 100 and the value configured for the second wireless network temporary identifier used for the D2D communication is 200, if the transmission grant information is obtained by descrambling through the identifier with the value of 100, the applicable D2D transmission direction determined in step S103 is from the first terminal to the second terminal, and the first terminal sends the data; if the transmission grant information is obtained by descrambling through the identifier with the value of 200, the applicable D2D transmission direction determined in step S103 is from the second terminal to the first terminal, and the first terminal receives the data.

Alternatively, the first terminal acquires the wireless network temporary identifier used for the D2D communication in step S101, which includes: acquiring cell wireless network temporary identifiers of the first terminal and the second terminal; and the transmission grant information includes device to device communication indication information. The cell wireless network temporary identifiers of the first terminal and the second terminal may be configured to act as the wireless network temporary identifiers used for the D2D communication. The D2D communication indication information included in the transmission grant information is used for explaining to the first terminal that the grant information is used for the D2D transmission. When the indication is not included, the first terminal determines that the grant information is used for authorizing the transmission between the terminal and a base station, but not used for authorizing transmission of the D2D communication.

Specifically, when the D2D communication is performed according to the cell wireless network temporary identifiers, the cell wireless network temporary identifiers of the first terminal (a local end) and the second terminal (a peer end) need to be acquired simultaneously in step S101. The scrambled transmission grant information is descrambled by using the cell wireless network temporary identifier of the local end or of the peer end; the first terminal performs the D2D communication with the second terminal according to the descrambled transmission grant information. When the transmission grant information is obtained by descrambling through the cell wireless network temporary identifier of the first terminal, the first terminal sends the data to the second terminal according to the transmission grant information; when the transmission grant information is obtained by descrambling through the cell wireless network temporary identifier of the second terminal, the first terminal receives, according to the transmission grant information, the data sent by the second terminal.

By sending, to the terminal, the wireless network temporary identifier used for performing the device to device communication and the transmission grant information, the terminal may realize the D2D communication in a simple and quick way according to the wireless network temporary identifier used for performing the device to device communication and the transmission grant information, thereby satisfying a requirement of D2D data transmission between users.

Figure 4:
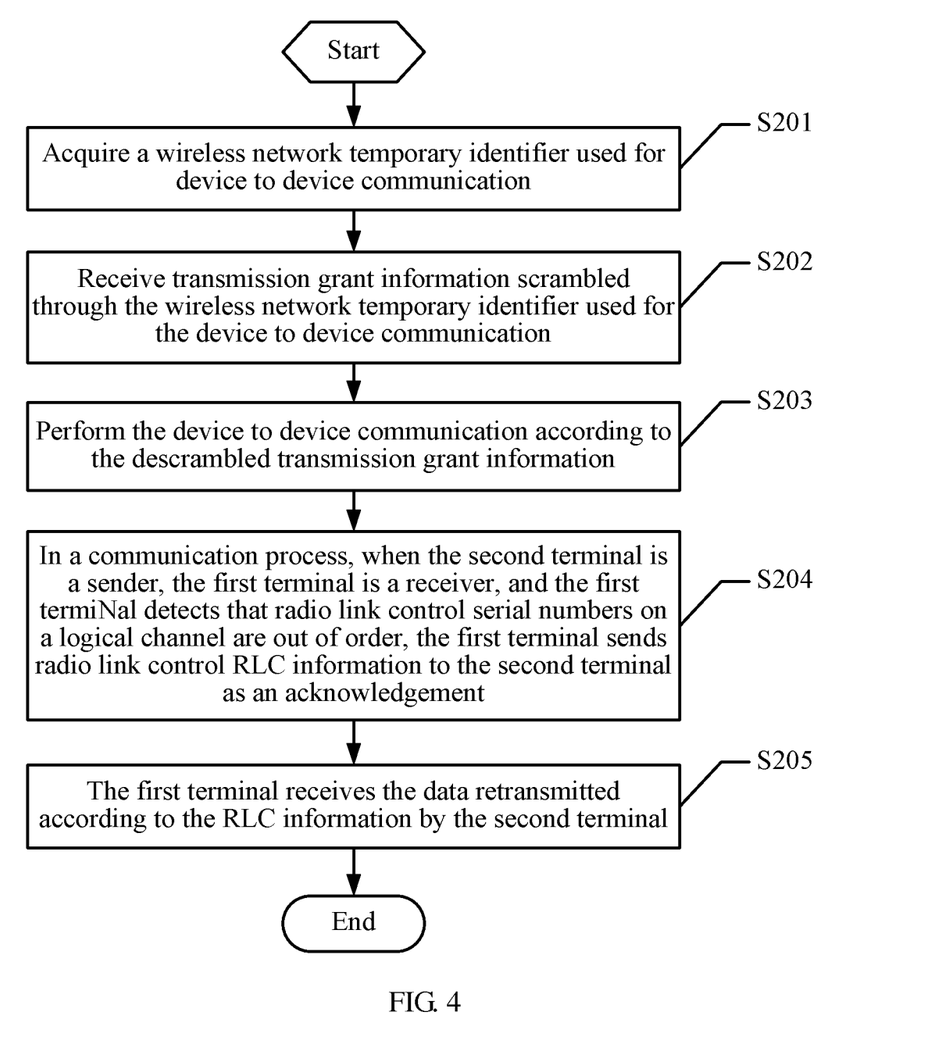
FIG. 4 is a schematic flow chart of Embodiment 2 of a method for realizing device to device communication of the present invention.

FIG. 4 is a schematic flow chart of Embodiment 2 of a method for realizing device to device transmission of the present invention. In this embodiment, terminals need to perform D2D communication include a first terminal and a second terminal. The method includes:

S201: Acquire a wireless network temporary identifier used for device to device communication;

S202: Receive transmission grant information scrambled through the wireless network temporary identifier used for the device to device communication;

S203: Perform the device to device communication according to the descrambled transmission grant information;

S204: In a communication process, when the second terminal is a sender, the first terminal is a receiver, and the first terminal detects that radio link control serial numbers on a logical channel are out of order, the first terminal sends radio link control RLC information to the second terminal as an acknowledgement; and S205: The first terminal receives the data retransmitted according to the RLC information by the second terminal.

Further alternatively, before step S202, the method may further includes: acquiring a mapping which is between the logical channels of the device to device communication and sent by a base station; when the first terminal or the second terminal is the sender, sending, by the first terminal or the second terminal, buffer status of the logical channel of the device to device communication to the base station.

Further alternatively, in the D2D communication process performed in step S203, the method further includes: sending, by the first terminal or the second terminal, a device to device transmission report to the base station. The device to device transmission report includes a report type indication, where the report type indication is at least one piece of the following information: device to device transmission failure information, device to device transmission completion information, and device to device transmission format adjustment information.

Further alternatively, after the device to device transmission is completed, the method further includes: performing, by the first terminal and the second terminal, HARQ acknowledgement and HARQ retransmission.

In this embodiment, the RLC serial number detection performed on the logical channel in the D2D communication process and the data retransmission performed when data is transmitted out of order can ensure the accuracy and completeness of data of the D2D transmission.

Figure 5:
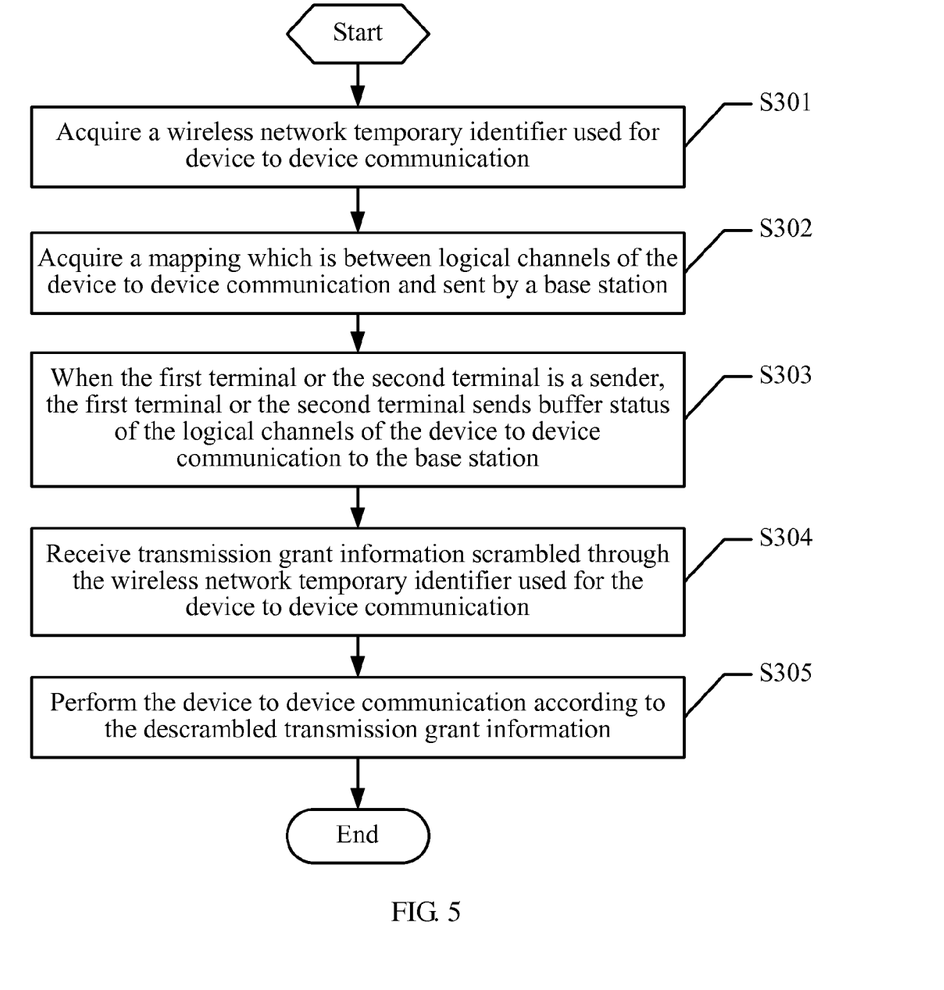
FIG. 5 is a schematic flow chart of Embodiment 3 of a method for realizing device to device communication of the present invention.

FIG. 5 is a schematic flow chart of Embodiment 3 of a method for realizing device to device transmission of the present invention. In this embodiment, terminals need to perform D2D communication include a first terminal and a second terminal. The method includes:

S301: Acquire a wireless network temporary identifier used for device to device communication;

S302: Acquire a mapping which is between logical channels of the device to device communication and sent by a base station;

S303: When the first terminal or the second terminal is a sender, the first terminal or the second terminal sends buffer status of the logical channel of the device to device communication to the base station;

S304: Receive transmission grant information scrambled through the wireless network temporary identifier used for the device to device communication; and S305: Perform the device to device communication according to the descrambled transmission grant information.

In this embodiment, the mapping which is between the logical channels and sent by the base station is acquired before establishing the D2D communication, and the first terminal or the second terminal that acts as the sender sends buffer status of the logical channel of the device to device communication to the base station, thereby better realizing the D2D communication from the first terminal to the second terminal.

Figure 6:
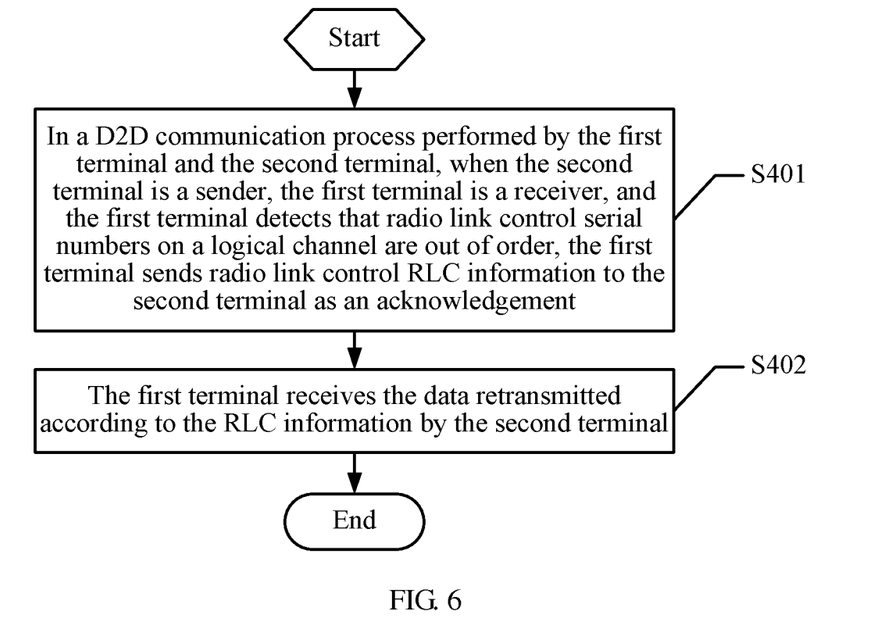
FIG. 6 is a schematic flow chart of Embodiment 4 of a method for realizing device to device communication of the present invention.

FIG. 6 is a schematic flow chart of Embodiment 4 of a method for realizing device to device transmission of the present invention. In this embodiment, terminals need to perform D2D communication include a first terminal and a second terminal. The method includes:

S401: In a D2D communication process performed by the first terminal and the second terminal, when the second terminal is a sender, the first terminal is a receiver, and the first terminal detects that radio link control serial numbers on a logical channel are out of order, the first terminal sends radio link control RLC information to the second terminal as an acknowledgement; and S402: The first terminal receives data retransmitted according to the RLC information by the second terminal.

In this embodiment, the RLC serial number detection performed on the logical channel in the D2D communication process and the data retransmission performed when data is transmitted out of order can ensure the accuracy and completeness of data of the D2D transmission.

Figure 7:
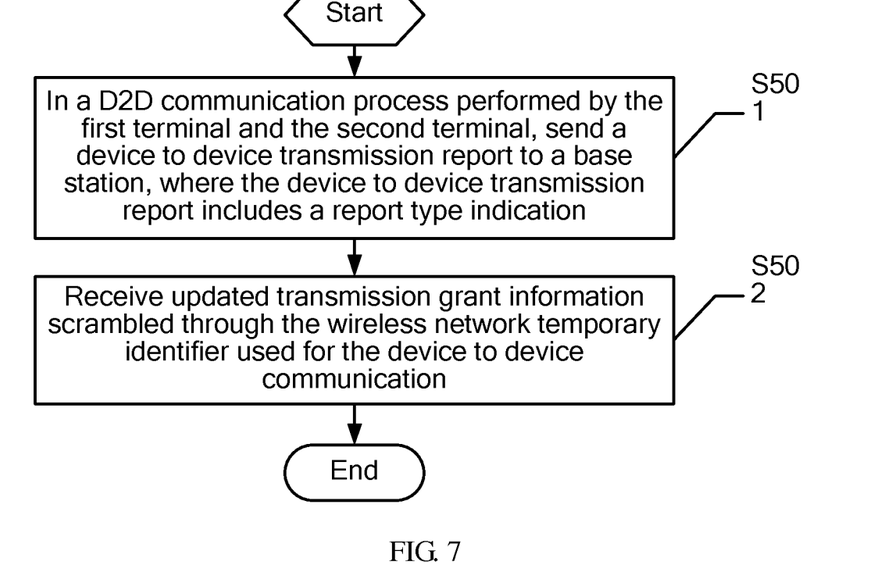
FIG. 7 is a schematic flow chart of Embodiment 5 of a method for realizing device to device communication of the present invention.

FIG. 7 is a schematic flow chart of Embodiment 5 of a method for realizing device to device transmission of the present invention. In this embodiment, terminals need to perform D2D communication include a first terminal and a second terminal. The method includes the following steps.

S501: In a D2D communication process performed by the first terminal and the second terminal, send a device to device transmission report to a base station, where the device to device transmission report includes a report type indication.

The report type indication is at least one piece of the following information:
  device to device transmission failure information;
  device to device transmission completion information; or
  device to device transmission format adjustment information.

For example, the device to device transmission format adjustment information may be used for indicating a device to device transmission situation, may also be used for indicating an adjustment on a modulation and coding scheme (modulation and coding scheme, MCS for short) of the current transmission and/or an adjustment on a data transmission power scheme.

The sending the device to device transmission report to the base station includes: sending the device to device transmission report to the base station according to time set by a timer.

Specifically, the timer is started after a D2D transmission report period configured by the base station is received; when the timer expires, the device to device transmission report is sent to the base station. For example, the number or proportion of HARQ or RLC transmission failures within the period is reported.

Alternatively, the sending the device to device transmission report to the base station includes: when detecting that the number or proportion of abnormalities incurred to device to device communication on the logical channel exceeds a threshold, sending the device to device transmission report to the base station.

Specifically, the D2D transmission report threshold configured by the base station is received, where the D2D transmission report threshold may be the number or proportion of the HARQ or RLC transmission failures. The device to device transmission report is sent to the base station after the D2D transmission report threshold is reached, for example, the number or proportion of HARQ or RLC transmission failures within the period is reported, or that the threshold is reached is simply indicated.

Alternatively, the sending the device to device transmission report to the base station includes: when the number of the device to device data retransmissions reaches the preset maximum number of retransmissions, sending the device to device transmission report to the base station.

Specifically, the maximum number of RLC transmissions or the maximum number of retransmissions configured by the base station is received; when the number of the D2D transmissions reaches the maximum number of RLC transmissions or the maximum number of retransmissions or the D2D transmission is completed, the device to device transmission report is sent to the base station, for example, D2D transmission failure, D2D transmission completion, or D2D transmission completion request is reported.

S502: Receive updated transmission grant information scrambled through the wireless network temporary identifier used for the device to device communication.

The base station may update, according to the transmission report, the transmission grant information scrambled through the wireless network temporary identifier used for the device to device communication, and indicates a new MCS and/or data transmission power in the transmission grant information, so as to instruct the first terminal and the second terminal to adjust the MCS and/or data transmission power before performing the data transmission. The first terminal or the second terminal is further configured to: after receiving the device to device transmission format adjustment indication sent by the base station, when receiving again the updated transmission grant information scrambled through the wireless network temporary identifier used for the device to device communication, restart the timer for retiming, so as to send the device to device transmission report to the base station.

If the type of the D2D transmission report received by the base station is the device to device transmission failure or device to device transmission completion, the base station switches the logical channel of the device to device transmission to an air interface transmission manner.

The manner used by the first terminal or the second terminal to send the D2D transmission report may be selected according to actual needs.

In this embodiment, the transmission grant information is updated according to the D2D transmission report, so as to perform the D2D data retransmission, and further ensure the accuracy and completeness of data of the D2D transmission, better realizing the D2D communication.

Figure 8:
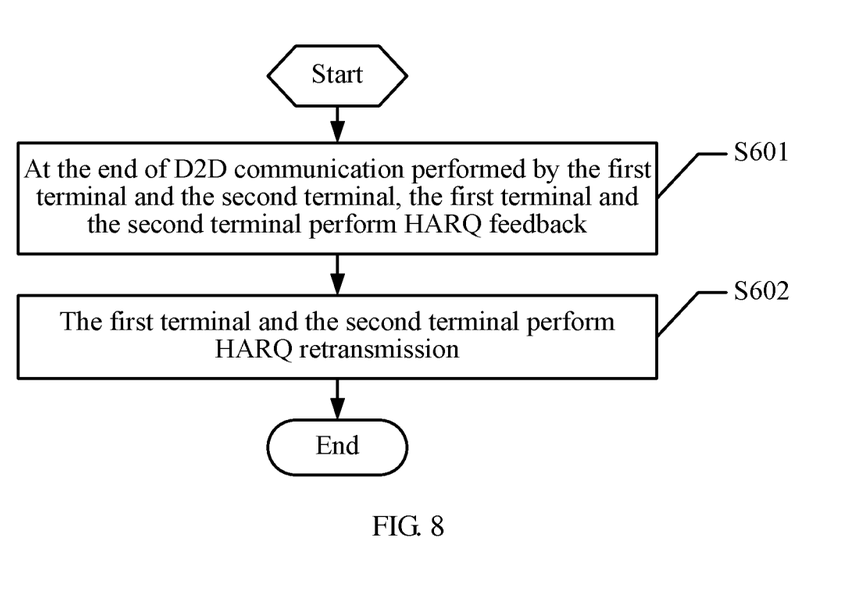
FIG. 8 is a schematic flow chart of Embodiment 6 of a method for realizing device to device communication of the present invention.

FIG. 8 is a schematic flow chart of Embodiment 6 of a method for realizing device to device transmission of the present invention. In this embodiment, terminals need to perform D2D communication include a first terminal and a second terminal. The method includes:

S601: At the end of D2D communication performed by the first terminal and the second terminal, the first terminal and the second terminal perform HARQ acknowledgement; and S602: The first terminal and the second terminal perform HARQ retransmission.

Specifically, the second terminal acting as a receiver performs the HARQ acknowledgement with the first terminal, and the first terminal performs the D2D HARQ retransmission according to the HARQ acknowledgement; alternatively, the second terminal acting as the receiver performs the hybrid automatic repeat request HARQ acknowledgement with the base station, and according to the hybrid automatic repeat request HARQ acknowledgement, the base station schedules the first terminal to perform the D2D HARQ retransmission.

In this embodiment, after the D2D communication ends, the HARQ acknowledgement is performed so as to perform the HARQ retransmission, and further ensure the accuracy and completeness of data of the D2D transmission, better realizing D2D communication.

Persons skilled in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a Read-Only Memory (Read-Only Memory, ROM), a Random Access Memory (Read-Only Memory, RAM), and the like.

The above are merely exemplary embodiments of the present invention. However, the protection scope of the present invention is not limited thereto. Therefore, equivalent changes derived according to the claims of the present invention shall fall within the protection scope of the present invention.

What is claimed is:

1. A method for realizing device to device communication, comprising:
   acquiring, by a terminal, a wireless network temporary identifier sent by a base station and used for device to device communication;
   receiving scrambled transmission grant information that has been scrambled with the wireless network temporary identifier sent by the base station and used for the device to device communication, the transmission grant information comprising an uplink grant or a downlink grant; and
   performing the device to device communication according to descrambled transmission grant information, comprising:

acquiring transmission carrier information, comprising:
    acquiring the transmission carrier information sent by the base station; or
    acquiring the transmission carrier information according to the transmission grant information; and
performing, on a carrier indicated by the transmission carrier information, the device to device communication according to the transmission grant information.

2. The method according to claim 1, wherein
the acquiring the wireless network temporary identifier sent by the base station and used for the device to device communication comprises: acquiring one wireless network temporary identifier sent by the base station and used for the device to device communication; and
the transmission grant information comprises device to device transmission direction indication information.

3. The method according to claim 1, wherein
the acquiring the wireless network temporary identifier sent by the base station and used for the device to device communication comprises: acquiring two wireless network temporary identifiers used for the device to device communication; and
the acquired wireless network temporary identifiers that are sent by the base station and used for the device to device communication are applicable to a device to device transmission direction.

4. The method according to claim 1, wherein
the acquiring the wireless network temporary identifier sent by the base station and used for the device to device communication comprises: acquiring cell wireless network temporary identifiers of a first terminal and a second terminal; and
the transmission grant information comprises device to device communication indication information.

5. The method according to claim 4, comprising
when the transmission grant information is obtained by descrambling through the cell wireless network temporary identifier of the first terminal, sending, by the first terminal, data to the second terminal according to the transmission grant information; and
when the transmission grant information is obtained by descrambling through the cell wireless network temporary identifier of the second terminal, receiving, by the first terminal according to the transmission grant information, data sent by the second terminal.

6. The method according to claim 1 wherein before the receiving the scrambled transmission grant information that has been scrambled with the wireless network temporary identifier sent by the base station and used for the device to device communication, the method further comprises:
    acquiring a mapping which is between logical channels of the device to device communication and sent by the base station.

7. The method according to claim 6, wherein before the receiving the scrambled transmission grant information that has been scrambled with the wireless network temporary identifier sent by the base station and used for the device to device communication, the method further comprises:
    sending buffer status of the logical channels of the device to device communication to the base station.

8. The method according to claim 6, further comprising:
when the second terminal is a sender, the first terminal is a receiver, and the first terminal detects that radio link control serial numbers on the logical channels are out of order, sending, by the first terminal, radio link control RLC information to the second terminal as an acknowledgement; and
receiving, by the first terminal, data that is retransmitted by the second terminal according to the RLC information.

9. The method according to claim 1, further comprising:
sending a device to device transmission report to the base station, wherein the device to device transmission report comprises a report type indication, and the report type indication is at least one of the following:
device to device transmission failure information;
device to device transmission completion information; or
device to device transmission format adjustment information.

10. The method according to claim 9, wherein
the sending the device to device transmission report to the base station comprises:
configuring a timer;
sending the device to device transmission report to the base station:
    according to time set by the timer; or,
    when detecting that the number or proportion of abnormalities incurred to device to device communication on the logical channel exceeds a threshold; or,
    when the number of device to device data retransmissions reaches a preset maximum number of retransmissions, sending the device to device transmission report to the base station;
wherein the method further comprising:
receiving updated scrambled transmission grant information that has been scrambled with the wireless network temporary identifier sent by the base station and used for the device to device communication; and
restarting the timer.

11. A terminal, comprising:
a non-transitory computer readable storage medium to store program(s), and
computer hardware configured to implement, including configured by the program(s) to:
acquire a wireless network temporary identifier sent from a base station and used for device to device communication, and scrambled transmission grant information that has been scrambled with the wireless network temporary identifier sent by the base station and used for the device to device communication, the transmission grant information comprising an uplink grant or a downlink grant; and
perform the device to device communication according to descrambled transmission grant information, comprising:
acquire transmission carrier information, comprising:
    acquire the transmission carrier information sent by the base station; or
    acquire the transmission carrier information according to the transmission grant information;
perform, on a carrier indicated by the transmission carrier information, the device to device communication according to the transmission grant information.

12. The terminal according to claim 11, wherein
the computer hardware is further configured to acquire one wireless network temporary identifier sent by the base station and used for the device to device communication; and
the transmission grant information comprises device to device transmission direction indication information.

13. The terminal according to claim 11, wherein the computer hardware is further configured to acquire two wireless network temporary identifiers used for the device to device communication; and the wireless network temporary identifiers which are sent by the base station and used for the device to device communication are applicable to a device to device transmission direction.

14. The terminal according to claim 11, wherein the computer hardware is further configured to acquire cell wireless network temporary identifiers of a first terminal and a second terminal; and the transmission grant information comprises device to device communication indication information.

15. The terminal according to claim 14, wherein the computer hardware is further configured to:

when the transmission grant information is obtained by descrambling through the cell wireless network temporary identifier of the terminal, send data to the second terminal according to the transmission grant information;

and when the transmission grant information is obtained by descrambling through the cell wireless network temporary identifier of the second terminal, receive, according to the transmission grant information, data sent by the second terminal.

16. The terminal according to claim 11, wherein the computer hardware is further configured to acquire a mapping which is between logical channels of the device to device communication and sent by the base station.

17. The terminal according to claim 16, wherein the computer hardware is further configured to: when the terminal is a sender and before the computer hardware receives the scrambled transmission grant information that has been scrambled with the wireless network temporary identifier sent by the base station and used for the device to device communication, send buffer status of the logical channel of the device to device communication to the base station.

18. The terminal according to claim 16, wherein the computer hardware is further configured to: when the second terminal is a receiver, the terminal is the sender, and the second terminal detects that radio link control serial numbers on the logical channel are out of order, receive radio link control RLC information sent by the second terminal; and the terminal further comprises a retransmission module, configured to retransmit data to the second terminal according to the RLC information.

19. A communication system, comprising:

a first terminal;

a second terminal; and a base station, wherein the first terminal and the second terminal each are configured to acquire a wireless network temporary identifier which is sent by the base station and used for device to device communication, receive scrambled transmission grant information which is sent by the base station and that has been scrambled with the wireless network temporary identifier sent by the base station and used for the device to device communication, and perform the device to device communication according to descrambled transmission grant information, wherein the transmission grant information comprising an uplink grant or a downlink grant, the first terminal and the second terminal are configured to perform device to device communication according to the descrambled grant information by acquiring transmission carrier information, and performing, on a carrier indicated by the transmission carrier information, the device to device communication according to the transmission grant information, and the acquiring the transmission carrier information including:

acquiring the transmission carrier information sent by the base station through a radio resource control message; or acquiring the transmission information according to the transmission grant information.

\* \* \* \* \*